Patented May 15, 1934

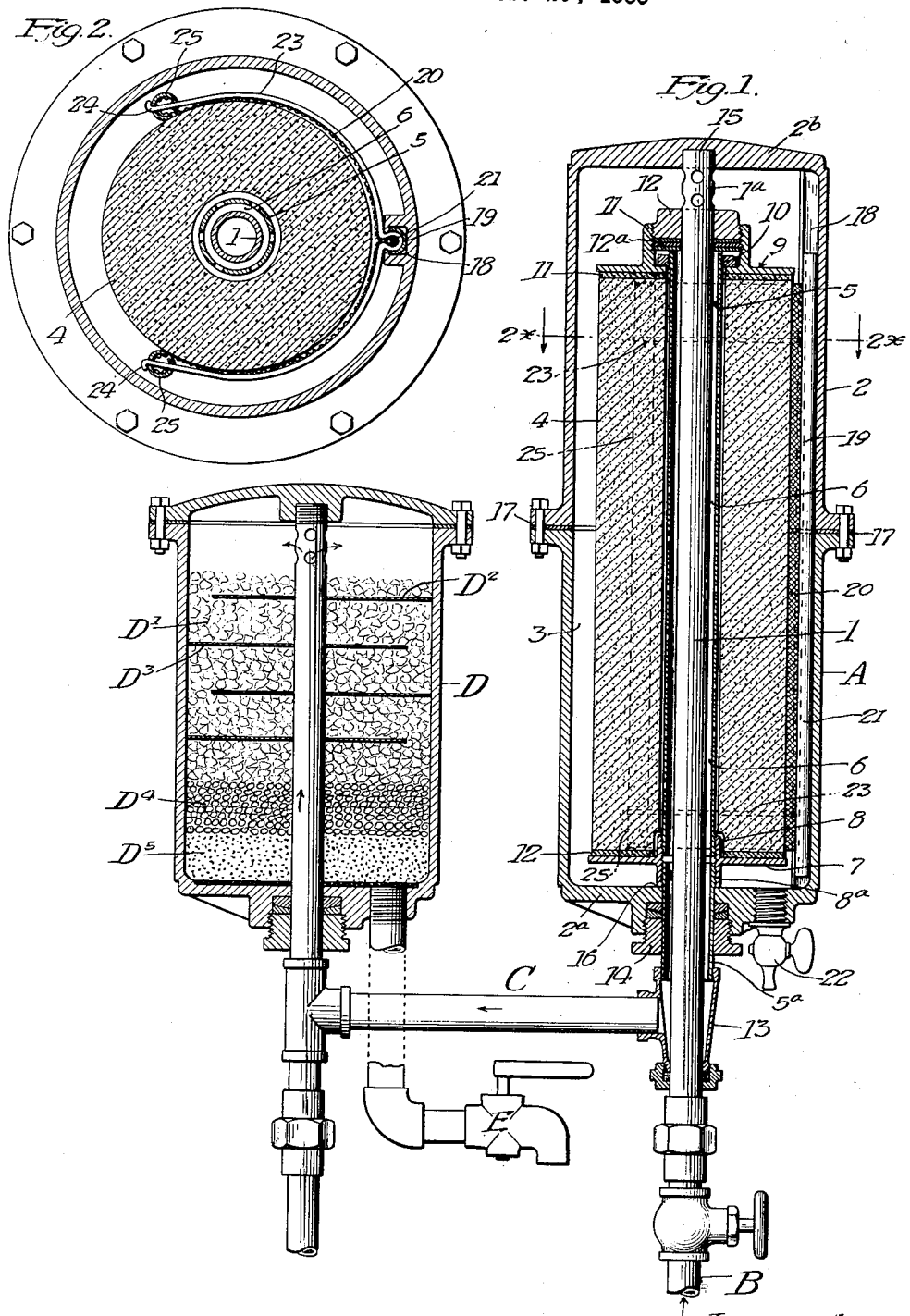

1,958,728

UNITED STATES PATENT OFFICE 1,958,728

FILTER

James Claude Thornburgh and Everett S. Cason, Chicago, Ill, assignors to Pure Water Systems, Inc., Chicago, Ill., a corporation of Illinois Application February 25, 1933, Serial No. 658,546

8 Claims. (Cl. 210—118)

This invention relates to filters of the type in which the fluid to be filtered flows through a porous body and leaves its arrested impurities largely deposited upon and even to some extent permeated beneath the surface toward which the fluid flows in the filtering action.

In filters of this kind it is important, in order to maintain efficient flow, to have means whereby the arrested impurities may be dislodged from the surface upon which they are deposited; and in filters using a type of filter body in which the external pores are liable to become filled, it is desirable to remove the surface of the filter body by abrasion, in accomplishing the desired degree of cleansing effect.

The present invention proceeds upon the principle of associating with a filter body, within its housing or container, a surface cleanser adapted to impose a scouring action upon the collecting surface; preferred embodiments of the invention involving one or both of the adjunctive features of having the scouring element effect an abrasion of the surface material of the filter body by relative movement developed between them, and having the scouring element and the filter body supported one by the housing and the other by an independent support, for instance, a pipe or pipes through which the fluid enters or leaves the filter, or upon one of said pipes through the medium of the other pipe so that by manually imparting movement, for instance, rotary movement, to one of said members, for instance, the housing, the necessary scouring action can be developed.

Other novel features also included in preferred embodiments of the invention will be found in the ensuing description of an embodiment of the invention shown by way of illustration in the accompanying drawing.

In said drawing—

Figure 1 is a vertical axial section of a filter embodying the several features of the invention and associated with chemical treatment apparatus through which the fluid may flow in addition to being passed through the filter proper.

Figure 2 is a section on the line 2x—2x of Figure 1.

A represents the filter as a whole; B a pipe for supplying water or other liquid that is to be filtered; C a delivery pipe; and D a chemical treatment unit. The unit D forms no essential part of the present invention and need not be described further than to state that its essential elements are the housing to one end of which liquid to be purified is delivered, and containing a body of reagent D' in subdivided or permeable form, with baffles D2 causing the liquid to follow a circuitous course and acquire greater surface contact with the said reagent, and one or more arresting subdivided bodies such as gravel D4 and sand D5 through which the liquid must pass in order to reach the dispensing cock E.

Filter A comprises a supply pipe 1, having a perforated upper discharge end 1a within an outer shell or housing 2 into which the fluid is released with access to chamber 3 surrounding a filter body 4. Within the filter body 4 is a perforated liner 5 through which filtered liquid can flow in gaining access to discharge passage 6. The liner 5 serves as a tie-rod between the lower disk 7 which receives said tie-rod through means of threaded flange 8 and upper disk 9 which is engaged with the tie-rod through the medium of a shoulder nut 10. By adjustment of these elements, the filter body 4 may be firmly clamped in position and released when it becomes necessary to replace it. An upstanding flange 11 on disk 9 is internally threaded to receive packing nut 12, which, with interposed packing 12a, seals the upper end of passage 6 against inflow of impure fluid. Coupling flange 8 on lower disk 7 is continued below the disk and receives nipple 5a which constitutes a continuation of the liner 5 and extends through the lower head 2a of the housing 2, where it is connected by a special fitting 13 with the delivery pipe C, which ordinarily will be so associated with other apparatus or fixtures as to resist rotation of the liner 5, 5a and filter body 4. A gland 14 packs the head 2a against leakage of fluid past the nipple 5a but leaves said head rotatable upon said nipple. The upper head 2b of the housing 2 is constructed with a step 15 which rests upon the upper end of pipe 1, thereby utilizing said pipe as a stud for supporting the housing vertically while permitting its rotation. The housing being thus suspended vertically, it is in condition to afford vertical support to the filter body 4 without interfering with relative rotation between the housing and said body; but this results from the stepping of the depending coupling flange 8a which is rigidly related to the filter body upon the lower head 2a at the point 16. For convenience in assembly and disassembly incident to repair of internal parts or replacement of the filter body 4, the housing 2 may be formed of two cup-shaped members united by appropriately packed flange coupling 17.

Housing 2 is constructed with an undercut or

T-shaped slot 18 that receives the roll 19 and scouring element 20 preferably in the form of a wire fabric or other efficient scouring material; and this roll is secured in place by means of a rod 21 extending longitudinally through the roll. Scouring element 20 conforms to the surface, preferably cylindrical, of filter body 4 so that if relative rotation can be set up between the scouring element and the filter body, an effective scouring action will be produced. The scouring element being anchored to the housing 2 by reason of its entry into the undercut groove 18, the necessary rotary scouring action is conveniently set up by rotating the housing 2 while the filter body 4 is held stationary by liner 5 through the medium of disks 7 and 9.

Filter body 4 will preferably be of a material yielding to the abrasive action of the scouring element and thus, when scouring takes place, yield sufficient of its outer surface to dislodge not only impurities that have deposited upon the surface, but those that have permeated within the surface. Such removal of material with the impurities will leave the latter ladened to an extent that renders more efficient its precipitation into the bottom space of the housing 2, whence it may be drawn off by means of the bleeder 22.

To properly sustain the scouring element 20 in proper relation to the cylindrical surface of the filter body 4, resilient stiffening ribs 23 are incorporated with the scouring element, for instance, by providing a loop 24 on each rib which may be engaged by the anchoring pin 21 while the outer ends 24 of said ribs are extended through or otherwise engaged with tubular binders 25 which embrace the raw edges of the wire fabric scouring element.

Notwithstanding the gradual decrease of the diameter of the filter body under the erosion of scouring action, ribs 23, by their resiliency, continue to press the scouring cloth of woven metal into contact with the surface of the filter body until the latter is so far reduced in dimensions as to render desirable its replacement by a new filter body.

We claim:

1. A filter, comprising a filter body having a fluid space interior thereto, a housing outside of said filter body and spaced to provide a fluid chamber exterior thereto, a support mounting said housing with freedom of movement in response to manipulation, means holding said filter body to prevent its movement with the housing, and a scouring element contacting the filter body and having a connection with the housing through which it is moved by the housing.

2. A filter as described in claim 1, in which the support for the housing and the holding means for the filter body are tubes, one within the other, extending axially into the filter and having communication, respectively, with the chamber within the housing but outside of the filter body and the fluid space interior to said filter body.

3. A filter as described in claim 1 in which the mounting for the housing comprises a support extending axially into the housing, and the filter body is supported by the interior of the housing and is connected with the means that prevents rotation of the filter body.

4. In a filter, a housing adapted to rotate in response to manipulation, a supporting pipe extending axially into said housing and providing rotary support therefor, a holding means concentric with said pipe and extending into said housing, a filter body located within and supported upon the housing but having connection with said holding means for preventing it from rotating with the housing, and a scouring element cooperating with said filter body and having connection with the housing through which it is rotated by the housing.

5. In a filter, a housing, a pipe entering through one end of said housing and providing a rotary bearing for the other end thereof, said housing being thereby mounted for rotation in response to manipulation, a filter body located within said housing surrounding said pipe and resting at one end upon the housing, means extending from said filter body concentrically with the pipe through the end of the housing and adapted to hold the filter body against rotation with the housing, and a scouring element located within the housing in contact with the filter body and having connection with the housing through which it partakes of rotation of the housing.

6. A filter as described in claim 1, in which the filter body has a support which is sustained vertically by the housing but which extends to the outside of the housing and is there provided with the means which holds the filter body against rotation with the housing.

7. A filter as described in claim 1, which includes a supporting stud, a tubular liner surrounding the supporting stud, disks at the ends of the filter body united and drawn against the ends of said filter body by means of said liner, a step on the housing receiving and supporting said tubular liner and an extension on said tubular liner, connecting it with the means that hold the filter body against rotation with the housing.

8. In combination with a filter body, a scouring element in sheet form conforming to a surface of said filter body, a housing surrounding said filter body and scouring element, and a sustaining rib pressing said scouring element, said filter body and housing being mounted for relative rotation into contact with said filter body; said rib and scouring element having each a portion deflected into engagement with said housing and thereby brought under control of said housing to develop scouring action during relative movement between the filter body and the housing.

JAMES CLAUDE THORNBURGH.
EVERETT S. CASON.